J. H. MEACHAM.
APPARATUS FOR MEASURING BOOTS AND SHOES.
APPLICATION FILED DEC. 18, 1907.
1,071,773.  Patented Sept. 2, 1913.
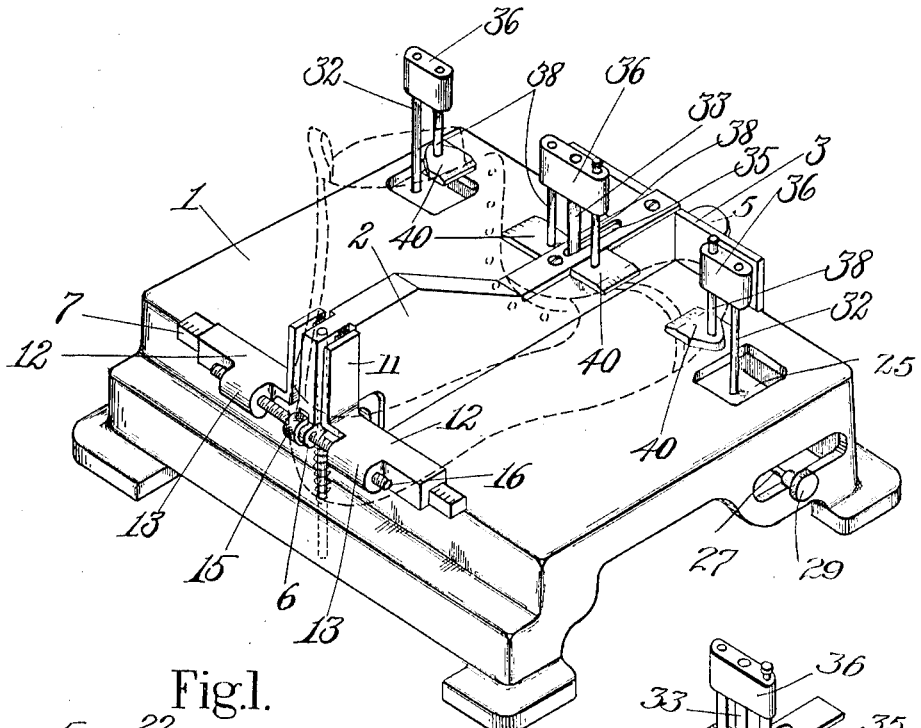
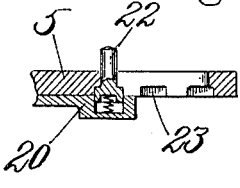
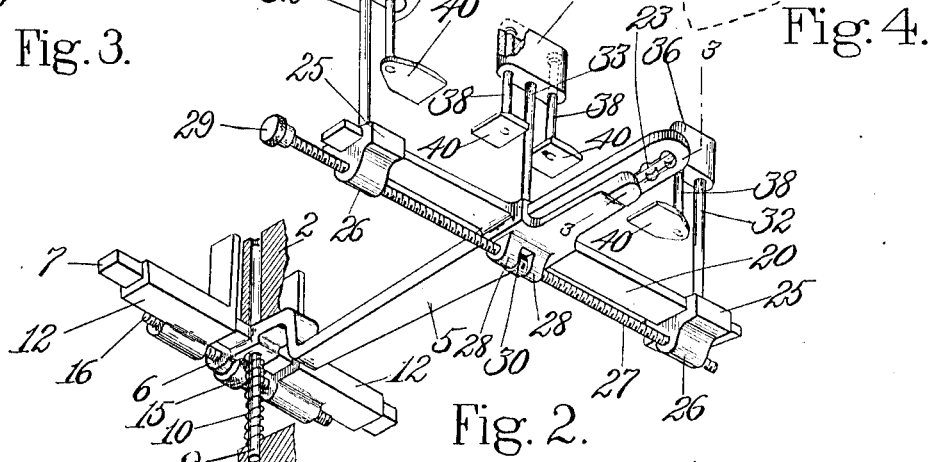

UNITED STATES PATENT OFFICE.

JOHN H. MEACHAM, OF HAVERHILL, MASSACHUSETTS, ASSIGNOR TO UNITED SHOE MACHINERY COMPANY, OF PATERSON, NEW JERSEY, A CORPORATION OF NEW JERSEY.

APPARATUS FOR MEASURING BOOTS AND SHOES.

1,071,773.  Specification of Letters Patent.  Patented Sept. 2, 1913.

Application filed December 18, 1907. Serial No. 407,069.

*To all whom it may concern:*

Be it known that I, JOHN H. MEACHAM, a citizen of the United States, residing at Haverhill, in the county of Essex and Commonwealth of Massachusetts, have invented certain Improvements in Apparatus for Measuring Boots and Shoes, of which the following description, in connection with the accompanying drawings, is a specification, like reference characters on the drawings indicating like parts in the several figures.

This invention relates to measuring instruments, and more particularly to apparatus for measuring boots and shoes.

In the manufacture of shoes having toe tips, it is usually necessary to measure the length of such tips to facilitate matching a right shoe with a left shoe to constitute a well-mated pair of shoes.

It is an object of this invention to enable the measuring and matching operation to be performed more quickly and accurately than heretofore, also preferably to measure both the length and the alinement of the toe tip, and more specifically to measure two shoes of a proposed pair at once.

Matching an appropriate right shoe with an appropriate left shoe to constitute a pair of shoes, which includes the tip measuring operation, is usually performed immediately after the pulling over operation. Heretofore such tip measuring has been done in various ways, the operator frequently relying upon the accuracy of his eye, or utilizing a scale in some manner. Ordinarily the operator picks up one shoe, holding it in his left hand, and holding a small scale, manufactured for the purpose, in his right hand, measures the length of tip by rocking the scale from approximately the center of the toe back along the curved length of the tip. If a left shoe, for example, has been first measured, the operator then measures the lengths of tips on successive right shoes of the same size until one is found to correspond with the left previously measured and both are suitable to match as a pair. This measuring and matching operation is of great importance, and it is a usual rule in shoe factories that the lengths of toe tips upon each shoe of a pair shall be within one-sixteenth of an inch of each other. The methods heretofore used, however, admit of great inaccuracy, much more than the customary one-sixteenth of an inch allowance, and all such methods have proven slow and unsatisfactory in practice.

It is an important feature of this invention to provide means whereby the tip measuring operation can be performed quickly, without skill, with perfect accuracy, and by one hand of the operator.

It is also one of the objects of the invention to provide an apparatus whereby a plurality of shoes can be measured at one and the same operation, and in the same time required for the measurement of one shoe. In the form herein shown this object is readily accomplished for two shoes, but it is within the scope of the invention to measure any number of shoes, or pairs of shoes, at one operation.

It is also an important feature of this invention to measure the alinement of the tip seam. This seam, uniting the tip to the vamp, may be in a straight line across the shoe, or may be "pulled over" at an inclination either to the right or left of such line, depending upon the style of last. Heretofore there have been no means of measuring either the degree of inclination or the accuracy of the alinement of an inclined tip seam, except by slow and numerous measurements by hand. The present invention comprises means for measuring the alinement of a tip seam whether straight or inclined across the last. As herein shown the apparatus comprises means for making such measurements upon two shoes at a time, in addition to the measurements for lengths of tips above mentioned, and both devices are actuated by the same means and at the same movement.

It is a further object of this invention to provide means having capacity for measuring a wide range of different sizes, styles, and alinements, without adjustments of the measuring devices. Thus in the preferred embodiment of the invention herein shown, an entire series of men's sizes could be measured without readjusting the devices. Then upon adjusting for women's shoes, an entire series of women's sizes could be measured. This construction assists very materially in the rapidity with which the measuring operation can be performed, as heretofore measuring devices required adjustment to each shoe measured.

The use of this apparatus is not limited to the first measuring and matching operation above described, as it is also available for use at other stages in the manufacture of boots and shoes. For example, in shoe factories, a pair of shoes will frequently become separated. One shoe of a pair may be damaged and discarded, or one may be lost during the various processes of manufacture. These odd shoes are measured and rematched in the finishing or packing room of the factory, and this apparatus can be advantageously used in such operation.

The scope of the invention and the various features thereof are to be ascertained from the claims at the end of the following description of the illustrated apparatus.

In the drawing is shown a preferred embodiment of my invention, adapted for measuring the length of tips and alinement of tip seams upon two shoes at one operation.

Figure 1 is a perspective view of the apparatus and table therefor. Fig. 2 is an underneath view of the mechanism, showing a fragment only of the table and partition. Fig. 3 is a cross-section on the dotted line 3—3 of Fig. 2. Fig. 4 illustrates a modification of the gages.

The apparatus is conveniently mounted in connection with a table 1. The upper surface of the table is divided into right and left sides by the vertical partition 2 and an end piece 3 is secured to the partition 2 and serves as a stop for the abutting toes of shoes to be measured or matched.

The movable portion of the device comprises a central bar 5 connected with two cross bars 7 and 20, and upon these cross bars are attached heel and toe measuring gages, with adjusting means therefor. The bar 5 is placed underneath the table 1 and parallel with the partition 2, and it is rigid at its rear end with a vertical pin 9, said pin being arranged to support the bar 5 and to slide in perforations provided therefor in the partition 2 and the lower portion of the table 1, as shown in Fig. 2. A spring 10 bearing upon the table 1 and against the lower side of bar 5 encircles a portion of the lower part of the pin 9 and is coiled to exert an expansive force, sufficient to maintain the bar 5 and its attachments in extreme raised position with the bar 5 in contact with the overhanging rear portion of the partition 2.

Upon the rear cross piece 7 are right and left heel plates 12, 12, disposed on right and left sides respectively of the partition 2. Each heel plate is intended as a rest for the heel of a shoe to be measured, and has an upward extension 11 to contact with the inner side of the shoe. The heel plates are arranged to slide upon the right and left arms respectively of the cross piece 7, and can be adjusted lengthwise of said cross piece. A scale may be cut upon the cross piece to show the amount of such heel plate adjustment. Simultaneous movement and equal adjustment of these heel plates are obtained by the right and left screw 16 passing through threaded lugs 13 on each plate. Said screw is operated by the thumb nut 15 keyed thereto and this thumb nut is held between the bifurcated extension 6 of the bar 5, as shown in the drawing.

The forward cross piece 20 is slidingly mounted upon the bar 5 and is secured in desired longitudinal position thereon by means of a spring-pressed bolt 22, arranged to register with notches 23 in the bar 5, as shown in cross-section in Fig. 3. Blocks 25 are constructed to slide upon the cross piece 20, and are simultaneously adjusted by means of the right and left screw 27, passing through threaded holes in lugs 26 formed integral with the blocks 25. A thumb nut 29 is provided to rotate the screw. Screw 27 is supported by lugs 28, 28 on the cross piece 20, and a rigid collar 30 arranged between said lugs maintains it in position.

A vertical post 32 is supported by each sliding block 25 and extends upward through open spaces in the table 1, said openings being of sufficient area to permit movement of the post during adjustment of blocks 25 and cross piece 20. A central vertical post 33, mounted directly on the cross piece 20, extends upwardly through a slot 35 in the partition 2. Secured by a set screw to the upper part of each vertical post is a block 36. These blocks 36 are considerably above the table 1, and rods 38 depend from and are held by said blocks 36, each rod 38 carrying a gage 40. The post 33 by reason of its position can conveniently carry two rods 38 and gages 40. The rods 38 are constructed to slide through holes in their respective blocks 36, but a bur or flange on the top of the rods prevents them from sliding too far downwardly. The gages 40 are suitable to contact with the upper of a shoe at or about the tip seam, and are of appropriate length to cover a considerable range, as shown.

In operating the apparatus, the heel plates may be first adjusted by appropriate manipulation of the thumb nut 15, rotating the right and left screw 16 until the desired position of the heel plate 12, 12 as shown by the scales on the cross piece 7 is reached. A considerable range in adjustment is requisite because of the differences in styles of lasts. A shoe to be measured, if it be a right shoe for example, is positioned to the right of the partition 2, with its toe against the stop 3, the side of the heel against the heel side gage 11 and the tread face of the heel upon the heel plate 12. A right shoe, so positioned, is shown in outline in Fig. 1. The operator, without releasing his hold upon the shoe and, if desired, as he positions it, may operate the mechanism by simply pressing downwardly upon the heel part of the shoe. The heel plate 12 and bar 5 being yieldingly sustained by the spring 10 readily yield to downward pressure, carrying down also the cross piece 20 and the posts 32 and 33. Such downward movement it is intended shall continue until the gages 40 contact with the upper side of the shoe at or about the tip seam. The gages 40 then rest upon the shoe and the posts 38 attached thereto are stopped and are constructed to slide through the blocks 36 should the downward movement of the bar 5 and consequent movement of blocks 36 be continued. As the gages 40 positively contact with the tip seam on each side of the shoe, the operator can accurately and instantly note the length of tip as thus measured, observing in which notch the spring bolt 22 may then be fast, and also can note the alinement of the tip seam from one gage to the other. It is also feasible to measure the alinement of the tip seam by setting the heel plate 12 outwardly or inwardly and thus swinging the toe of the shoe relatively, this setting of the heel plate being in addition to the adjustment of the heel plate for style of last. It will be noted that the tip measuring gages permit a considerable scope in measurements for length, width and alinement without readjustment. In measuring two shoes at once, for a pair of shoes or otherwise, the same operation suffices to measure both shoes. The operator, having positioned two shoes can measure both by depressing the rear portion of either shoe, or by bearing downward sufficiently on the thumb nut 15, blocks 36 or other portions of the mechanism. Upon releasing the downward pressure, the spring 10 elevates the mechanism with the shoe or shoes thereon into normal raised position. This return movement lifts the gages 40 from contact with the shoe, through the rods 38 as the blocks 36 being lifted catching the bur or shoulder formed on the top of rods 38. The shoe can then be removed without scraping the gages or scratching the upper.

Although the foregoing is the preferred mode of operation it is within the scope of this invention and it is feasible in using the device herein shown, as in measuring a large boot or shoe, to push the shoe into position and have its upper contact with the gages 40, without requiring any depression of the mechanism. Such gages are free to rise as the shoe is pushed forward and thus will show the measurements desired the instant the shoe is positioned and without any further operation. Should this mode of operation be practised, it might be desirable to form the gages as illustrated in Fig. 4, the gages 40' having a beveled edge or a turned-up lip to facilitate the movement of the shoe in sliding under the gage and lifting the latter. In the preferred embodiment of the invention, however, it is found more desirable to operate the gages by a separate movement, rather than by merely wedging the shoe.

Having thus described my invention, what I claim as new and desire to secure by Letters Patent of the United States is:—

1. In an apparatus of the character described, yielding means to support a shoe to be measured, and a gage arranged for yielding contact with said shoe.

2. In an apparatus of the character described, yielding means to hold a pair of shoes, and mechanism to measure the lengths of toe tips on both shoes simultaneously.

3. In an apparatus of the character described, yielding means to hold a pair of shoes, and mechanism to measure the alinement of tip seams on both shoes simultaneously.

4. In an apparatus of the character described, gages arranged for yielding contact with both shoes of a pair of shoes to be measured, adjusting means for said gages, and mechanism to cause said gages to contact simultaneously with said shoes.

5. In an apparatus of the character described, means to support a pair of shoes, movable gages to measure corresponding dimensions of both shoes, and mechanism to cause said gages to contact with both shoes at one operation.

6. In an apparatus of the character described, means to support a pair of shoes, gages to measure both the lengths of tips and alinements of tip seams in each shoe and mechanism to actuate said gages to effect said measurements upon each shoe simultaneously.

7. In a shoe tip measuring apparatus, yielding supporting means for a shoe to be measured and a gage constructed to contact yieldingly with such shoe, said gage being arranged for relative movement toward and away from said supporting means.

8. In a shoe tip measuring apparatus, means to support a plurality of shoes, measuring devices arranged for yielding contact with said shoes, and mechanism to cause two of said measuring devices to contact with each shoe to be measured at one operation.

9. In a shoe tip measuring apparatus, a table divided for a right and a left shoe to be positioned thereon, adjustable right and left heel plates, adjustable toe tip gages, means connecting said heel plates with said gages whereby operating one actuates the other, and a spring, whereby said plates and gages are arranged to be returned to starting position automatically after a measuring operation.

10. In an apparatus of the class described, supports for a pair of shoes, mechanism arranged to indicate the lengths and alinements of both tips of a pair of shoes, and means for rendering said mechanism operative arranged to be actuated by downward pressure applied to one shoe.

11. In an apparatus of the class described, a yielding support for a shoe to be measured, gages to measure the length of the tip and the alinement of the tip seam, and mechanism to render said gages operative actuated by downward pressure upon the heel portion of the shoe.

12. An apparatus of the class described comprising a table to support the forepart of a shoe to be measured, a yielding support for the heel part of the shoe, adjustable gages to indicate measurements on the forepart of the shoe and mechanism to move the gages into operative position actuated by downward pressure upon the yielding heel support.

13. In a shoe tip gaging apparatus, a tip seam gage, mountings in which said gage is held normally out of operative position and means arranged to be engaged by the shoe and to effect, by pressure of the shoe applied therethrough, movement of the gage into tip seam measuring position.

14. In a shoe tip gaging apparatus, a tip seam gage 40, means 10 for sustaining the gage above position for coöperating with the shoe, and an actuator 12 arranged to be operated by downward pressure of the shoe and connected with the gage to move the gage into coöperative relation to the shoe when the shoe presses down upon the actuator.

15. In a shoe tip gaging apparatus, a support, a tip seam gage movably mounted on the support, means for holding the gage normally out of operative position, and actuating means arranged to be operated, as an incident to the presentation of the shoe, for moving the gage into operative relation to the shoe.

16. In a shoe tip gaging apparatus, a tip seam gage adapted to engage the shoe upper at each lateral side of the shoe forepart and normally held away from tip gaging position, means for so holding the gage, and means arranged for operation by presentation of the shoe in position to be measured for moving both said gages into tip gaging position.

17. In a shoe tip gaging apparatus, a tip seam gage comprising a shoe engaging member, a cross-head, a stem sliding in the cross-head and by which said member is suspended; and an actuator operatively connected with the cross-head to force it toward the shoe, said sliding stem permitting movement of the cross-head relatively to the shoe engaging member after the latter has contacted with the shoe and while the actuator completes a normal movement unaffected by the thickness of the shoe.

18. In a shoe tip gaging apparatus, a tip seam gaging means having a definite position to adapt it to indicate at opposite lateral sides of the shoe the relation of the tip seam to a last which is definitely positioned laterally, a side gage for the rear part of the shoe by which to laterally position the shoe angularly with relation to the tip seam gaging means, and means operated by pressure applied through the shoe for moving the seam gage into contact with the toe portion of the shoe.

19. In a shoe tip gaging apparatus, tip seam gaging means adapted to indicate the relation of the tip seam to the last at opposite lateral sides of the shoe and normally held away from operative position, mountings and positioning means permitting the gage to be so held, a side gage for the rear part of the shoe, and an actuator arranged for operation by the shoe while the shoe is positioned against the side gage, said actuator being connected to the seam gaging means to move the latter into operative relation to the shoe so positioned.

20. In a shoe tip gaging apparatus, the combination with a toe end abutment, of a tip seam gage, a shoe gage actuator to move the seam gage by pressure of the shoe, means for reversely moving the seam gage, and a heel side gage on the actuator.

21. In a shoe tip gaging apparatus, the combination with a table, of a gage, a spring normally upholding the gage above the table, and means through which downward pressure of a shoe positioned under the gage will move the gage down upon the shoe.

22. In a shoe tip gaging apparatus, a tip seam gaging means having a definite portion to adapt it to indicate the relation of the tip seam to the last at opposite lateral sides of a right shoe, a duplicate means for the left shoe, and side gages for the inner sides of the rear parts of the right and left shoes by which to position the rear parts of the right and left shoes in like angular relation to their tip gaging means.

23. In a shoe tip gaging apparatus, a tip seam gaging means having a definite position to adapt it to indicate the relation of the tip seam to the last at opposite lateral sides of a right shoe, a duplicate means for the left shoe, side gages for the inner sides of the rear parts of the right and left shoes by which to position the rear parts of the shoes relatively to the tip gaging means, and means by which to effect equal and opposite adjustments of the side gages.

24. In a shoe tip gaging apparatus, a tip seam gaging means adapted to indicate the relation of the tip seam to the last at opposite lateral sides of a right shoe, a duplicate means for the left shoe, side gages for the inner sides of the rear parts of the right and left shoes by which to position the rear parts of the shoes relatively to the tip gaging means, and means for moving the tip gaging means into operative relation to the two shoes simultaneously.

In testimony whereof I have signed my name to this specification in the presence of two subscribing witnesses.

JOHN H. MEACHAM.

Witnesses:
EDITH C. HOLBROOK,
JAMES R. HODDER.

Copies of this patent may be obtained for five cents each, by addressing the "Commissioner of Patents, Washington, D. C."

Correction in Letters Patent No. 1,071,773.

It is hereby certified that in Letters Patent No. 1,071,773, granted September 2, 1913, upon the application of John H. Meacham, of Haverhill, Massachusetts, for an improvement in "Apparatus for Measuring Boots and Shoes," an error appears in the printed specification requiring correction as follows: Page 4, lines 107–108, claim 22, for the word "portion" read *position;* and that the said Letters Patent should be read with this correction therein that the same may conform to the record of the case in the Patent Office.

Signed and sealed this 16th day of January, A. D., 1917.

[SEAL.]

Cl. 73—64.

F. W. H. CLAY,
*Acting Commissioner of Patents.*